United States Patent [19]
Firth

[11] 3,827,558
[45] Aug. 6, 1974

[54] FLUID FILTER WITH BYPASS AND CONDITION INDICATOR

[75] Inventor: Robert L. Firth, Minneapolis, Minn.

[73] Assignee: Donaldson Company, Inc., Minneapolis, Minn.

[22] Filed: Nov. 9, 1972

[21] Appl. No.: 304,959

[52] U.S. Cl.............. 210/90, 210/91, 210/94, 210/131
[51] Int. Cl............................................. B01d 35/14
[58] Field of Search......... 210/90, 91, 94, 131, 133, 210/446

[56] References Cited
UNITED STATES PATENTS

| | | | |
|---|---|---|---|
| 2,287,344 | 6/1942 | Easton et al. | 210/131 |
| 2,562,361 | 7/1951 | Kasten | 210/131 |
| 3,323,649 | 6/1967 | Rosaen | 210/91 X |
| 3,368,680 | 2/1968 | Bozek | 210/90 |
| 3,591,002 | 7/1971 | Rosaen | 210/90 |

Primary Examiner—Charles N. Hart
Assistant Examiner—Robert G. Mukai
Attorney, Agent, or Firm—Ralph F. Merchant, Gauld, Smith, & Edell

[57] ABSTRACT

A cylindrical filter housing having an open top end and a closed bottom end is provided. A cover member for the housing includes a coaxially positioned, cylindrical guide portion. A cylindrical filter element is yieldingly biased against the guide portion and a bypass member is attached to the top of the filter element for guided sliding movements in the guide portion. An inlet opening in the cover leads to the opening in the guide portion, and an outlet opening in the cover leads to an annular chamber surrounding the filter element. An indicator tab on the bypass member extends upwardly behind a window located in a side wall of the cover, and the cover is constructed to provide an air pocket around the tab to resist entry of fluid therein.

3 Claims, 4 Drawing Figures

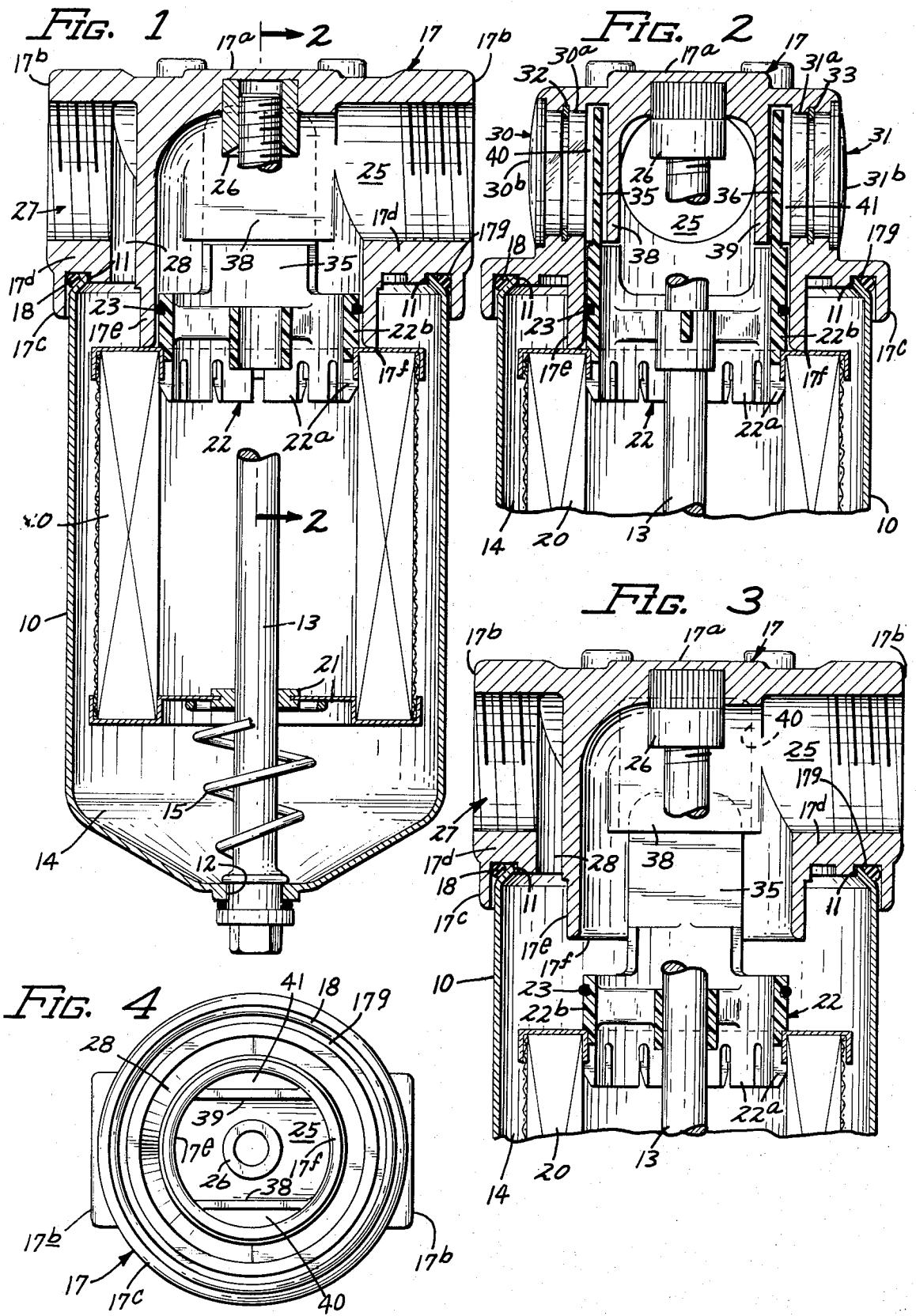
PATENTED AUG 6 1974
3,827,558

FLUID FILTER WITH BYPASS AND CONDITION INDICATOR

BACKGROUND OF THE INVENTION

1. Field of the Invention

This invention relates generally to fluid filtering devices with bypass means and means for indicating a bypass condition, and more particularly relates to an improved visual means of indicating normal and bypass conditions in a fluid filter.

2. Description of the Prior Art

Fluid filters of the type described herein are commonly used to filter fluid such as oil, as for example in hydraulically operated systems. Most fluid filters in use today employ a vacuum or pressure gauge to indicate clogging of the filter element. The more sophisticated filters have external pointers or the like connected by a mechanical linkage to a movable filter element or to a piston in a pressure chamber. These devices are all designed to give visual or audible indication that the filter is clogged, so that it can be changed. As a further safety measure, many filters employ bypass valves, usually in the nature of a spring-loaded relief valve. The purpose of the bypass valve is to permit oil to flow around the clogged filter element so that the system can continue to operate.

These safety features in the prior art devices have given rise to a number of problems. The use of mechanical linkages to provide visual indication, as shown for example in the Rosaen U.S. Pat. No. 3,113,925, makes the filter more expensive and difficult to manufacture, causes sealing problems in high pressure applications especially, and is susceptible to damage to the outside pointer. These mechanical indicators tend to become inoperative after a long period of use as a result of physical damage, corrosion and the like. Visual indicators have also been used to indicate the presence of a clogged filter element. The Rosaen U.S. Pat. No. 3,113,925 also discloses such a visual indicator. In the Rosaen patent, the space between the window and the filter element being viewed is filled with oil. After long periods of usage, the window and the element tend to become soiled, and the oil becomes more opaque, such that the bypass indication is no longer visible through the window. The problem actually becomes more acute after the filter becomes clogged, because at that time the bypass opens to permit unfiltered oil to flow through the system. This unfiltered oil tends to be more opaque than the filtered oil and thus obscures viewing of the indicator just when clear vision is most needed.

In some prior art filter devices, the visual indicator has been placed in the cover outside of the normal flow path. For example, the Cooper U.S. Pat. No. 3,508,657 shows a transparent cap extending upwardly from the cover through which is visible an upstanding indicator button. Although the Cooper indicator tends to avoid the problem of dirty oil obscuring the indicator, it raises the new problem of physical damage to the viewing window. If the transparent cap or window protrudes from the top of the cover, it is susceptible to breakage from falling objects or from being stepped upon by an operator who uses the fluid filter as a ladder. All of the different types of indicators that extend from the top of the cover are susceptible to this type of damage. Another example of this type of indicator is shown in the Stoermer U.S. Pat. No. 3,011,470, issued Dec. 5, 1961.

The fluid filter art has been highly developed, but in view of the problems outlined above, there continues to be considerable room for improving the operation and durability of these devices. Because of the damage to a system that can be caused by an improperly operating filter, it is imperative that every precaution be taken to insure that proper indication is given when the filter is no longer operative.

SUMMARY OF THE INVENTION

My invention provides a fluid filter having a bypass valve with an integral indicator which is located inside the filter housing to preclude damage in service, which requires no mechanical linkage and which can be used for both inside/out and outside/in flow through the element. In the preferred embodiment, a pair of indicator arms are attached directly to the bypass valve, which in turn is attached to the movable filter element. The indicator arms or tabs extend upwardly into the dome-like cover and the cover is provided with a pair of viewing windows in the side walls thereof. The viewing windows are located below the top wall of the cover so as to reduce the likelihood of damage thereto. In addition, each viewing window is actually a double window so that the outside window can be replaced without loss of fluid from the filter assembly. An important feature of the cover design is that a wall is provided behind each of the indicator tabs to form a pocket around the tab which is open only at the bottom. This provides an air pocket which resists entry of fluid therein. Thus, even if the fluid becomes dirty, it will not obscure the indicator. In the preferred embodiment shown in the drawings, the indicator tabs, which are colored a color such as green, occupy the entire viewing window. As the filter element becomes clogged, the pressure drop across the element increases and it is caused to move against the bias of the spring. The indicator tabs move with the filter element and progressively expose the pocket-forming wall behind the tab, which is colored a different background color such as red. This gives progressive warning that the element is becoming clogged. Again, because of the air pocket, there is no tendency to obscure the change in color of the indicator. These and other advantages of the present invention will be more fully described in the following specification.

BRIEF DESCRIPTION OF THE DRAWINGS

FIG. 1 is an axial sectional view of a preferred embodiment of the oil filter of the present invention;

FIG. 2 is a fragmentary sectional view taken along line 2—2 of FIG. 1;

FIG. 3 is a fragmentary view similar to the view of FIG. 1, with the filter element and bypass member being shown under bypass conditions; and FIG. 4 is a bottom plan view of the cover for the oil filter.

DESCRIPTION OF THE PREFERRED EMBODIMENT

Referring now to the drawings, wherein like reference numerals are used throughout the several views to indicate like elements of the invention, there is disclosed in FIG. 1 an oil filter having a generally cylindrical filter housing 10 having an open top end terminating in a circular edge 11 lying in a horizontal plane. The bottom end of housing 10 is closed off except for an axial opening 12 through which a mounting rod 13 extends. Housing 10 defines a filter chamber 14 through which rod 13 extends coaxial with housing 10. Rod 13 has a threaded top end portion which extends above the plane of circular edge 11. A coil spring 15 is mounted around rod 13 adjacent the bottom end of housing 10.

A dome-like cover member 17 is provided having a generally flat, horizontally extending top wall 17a with side walls generally designated 17b extending downwardly therefrom. The bottom of cover member 17 is provided with a cylinder-like portion 17c which fits snugly over the top end of housing 10. The bottom portion of cover member 17 further includes a bottom web portion 17d extending horizontally inwardly from the top of cylinder-like portion 17c, and a coaxially positioned, cylindrical or tubular guide portion 17e connected to the web portion 17d. In the embodiment shown, guide portion 17e extends a short distance downwardly into filter chamber 14 below the plane of circular edge 11. Guide portion 17e terminates in a bottom edge 17f which is circular and which lies in a horizontal plane. Formed in the bottom of web portion 17d adjacent outer portion 17c is an annular groove 17g into which the inwardly turned upper edge 11 of housing 10 extends. A circular 0-ring 18 is mounted in the groove 17g between the housing 10 and the cover 17 to provide an oil seal.

A cylindrical pleated filter element 20 is mounted in the filter chamber 14, around rod 13, coaxially therewith, between spring 15 and the bottom edge 17f of guide portion 17e. The top end of the filter element 20 engages the bottom edge 17f and is normally held tightly thereagainst by spring 15 to prevent oil flow therebetween. The bottom end of filter element 20 is provided with a disk-like closure member 21 secured thereto with an axial opening thereof slidably mounted on rod 13. The bottom side of closure member 21 engages the top end of spring 15. Thus, filter element 20 is yieldingly biased upwardly against guide portion 17e.

A tubular bypass member 22 has a lower end portion 22a thereof extending into and engaging the upper open end of the filter element 20. An upper end portion 22b thereof slidably extends into the axial or central opening of guide portion 17e. A flexible 0-ring type seal 23 is positioned between bypass member 22 and guide portion 17e to prevent fluid flow therebetween.

Cover member 17 is provided with a somewhat L-shaped fluid inlet passageway 25 which leads from an opening in an outer side wall 17b, where the passageway is threaded, to the center of the cover member 17 and thence downwardly to smoothly join the interior opening of guide portion 17e. Mounted in the top wall of passageway 25, coaxially with the housing 10, is a threaded anchor member 26 into which the threaded top end of rod 13 extends to securely hold cover member 17 on housing 10.

A fluid outlet passageway 27 is provided in cover member 17 which leads from an opening in a side wall 17b which is again threaded, through an arcuate opening 28 in web portion 17d into filter chamber 14. Opening 28 actually leads to an annular chamber which lies between housing 10 and filter element 20.

Fluid to be filtered thus enters through inlet passageway 25 and is carried by the L-shaped passageway downwardly through bypass member 22 into the interior of filter element 20. The fluid passes outwardly through the filter element into the outer part of the filter chamber 14 and then flows upwardly through the opening 28 out through outlet passageway 27.

In the embodiment shown the inlet and outlet passageways 25 and 27 are directly opposite each other in the side walls of the cover member 17. As best shown in FIG. 2, the other two side walls of the cover member 17 are provided with viewing windows 30 and 31. Windows 30 and 31 are circular and are formed from transparent glass or plastic. Each window comprises an inner pane 30a, 31a and an outer pane 30b, 31b spaced a slight distance therefrom. As shown in FIG. 2, the two outer windows 30b, 31b are depressed a short distance into the side walls of the cover member 17 in order to protect them as much as possible from physical damage. Further, top wall 17a of the cover member 17 is positioned above the level of the windows 30, 31 to further reduce the likelihood of damage. In the preferred embodiment, the inner windows 30a, 31a are adhesively secured in their respective openings and are also held from outward movement by snap rings 32, 33 which extend into corresponding grooves in the cover openings. The outer windows 30b, 31b are adhesively secured into the openings. Thus, if one of the outer windows 30b, 31b is accidentally broken or cracked, it can be replaced without affecting operation of the filter.

Extending upwardly from bypass member 22 are a pair of oppositely disposed tabs 35 and 36 which are normally positioned behind windows 30 and 31. In the preferred embodiment, bypass member 22 and tabs 35, 36 are integrally molded from a plastic material which carries a green pigment. Under normal fluid flow conditions, the two tabs 35 and 36 are positioned behind the windows 30 and 31 for visual observation, the green color indicating a normal filter condition.

If the filter element 20 should become clogged with foreign material, the pressure inside the filter element will increase, and will act against the bottom closure member 21 causing it to move downwardly against spring 15, carrying filter element 20 therewith. Filter element 20 moves downwardly carrying bypass member 22 therewith, as shown in FIG. 3. When the upper edge of bypass member 22 passes below the bottom edge 17f of guide portion 17e, oil is permitted to flow therebetween directly from the axial opening in guide portion 17e to the outlet opening 28. Thus, under bypass conditions, the filter element 20 is entirely outside the flow path. For this reason, material collected on the inside of the filter is not disturbed or carried away by the bypass flow. In the bypass condition, as shown in FIG. 3, the two upwardly extending tabs 35 and 36 are carried downwardly so that they are no longer fully visible through the windows.

Formed in the passageway 25 directly opposite each tab 35, 36 from its viewing window 30, 31 are walls 38, 39 which define pockets 40, 41 around the tabs 35, 36 respectively. As shown in FIG. 4, the walls 38 and 39 are parallel to each other and are connected at their opposite vertical side edges to the interior walls of the otherwise circular chamber. The two pockets 40, 41 thus defined are entirely closed except for the bottom openings into which the upwardly extending tabs 35, 36 extend. Pockets 40, 41 thus form air pockets to resist entry of fluid therein. Because air is trapped in the pockets 40, 41, oil is prevented from flowing upwardly into the pockets to obscure vision. Preferably, the surfaces of the walls 38, 39 which lie directly behind the two tabs are painted a bright color such as red which becomes clearly visible when the tab moves downwardly under the bypass condition of FIG. 3.

The present invention eliminates any mechanical linkage in the indicator system and provides a positive indication that the filter element has moved. At any given time, the indicator shows the exact position of the bypass valve. Because the indicator arms or tabs are located in cavities in the housing which also act as air pockets, entry of fluids therein is resisted. Thus, dirty fluid will not impair viewing of the tabs through the windows. Although two indicator arms and windows are shown in the preferred embodiment, to provide visual indication in both directions, a single arm can be used or the second arm may be used to actuate either an electrical switch by mechanical means or by means of a magnet attached thereto. To service the filter, the rod 13 is unscrewed from the cover member 17 so that the housing 10 can be detached from the cover. The filter element 20 can then be cleaned or replaced. A desirable feature of the structure shown is that under bypass conditions, the dirty oil side of the filter element 20 is out of the oil flow path. This prevents the oil from recapturing the earlier removed foreign material under bypass conditions.

The present invention can be utilized in a wide range of flow applications because the bypass member 22 is an element which is separate from the other elements forming the filter. Thus, the amount of bypass flow permitted can be changed by merely providing a bypass member 22 having different sized bypass openings. The shape of the bypass openings can also be changed to regulate the amount of increase of bypass flow per increment of movement of the filter element. Under some conditions, it is desirable to eliminate any bypass flow while retaining the benefits of the indicator portion of the present invention. The bypass member 22 can easily be converted to no bypass by simply reducing the depth of the cut-away portions between the two indicator tabs 35 and 36. The bypass member 22 would then be sufficiently long so that under all conditions of movement of the filter element 20, the upper portion of the bypass member 22 carrying the sealing ring 23 would remain in the tubular guide portion 17e. With this form of bypass member, there would be no bypass flow, but the movement of the tabs 35, 36 would still clearly indicate clogging of the filter element.

Although the drawings show a preferred form of filter in which the oil flow is from inside/out through the filter element, it is possible to utilize the present invention in a filter wherein the oil flow is from outside/in through the filter element. In that type of alternate structure, the spring would be located within the filter element to hold it in a normally lower position, and the tab would normally be outside of viewing range through the window. Under bypass conditions, the filter element would be forced upwardly and the tab would then become visible through the window. The form of the bypass member would also have to be changed if bypass flow were desired. However, the important features of the indicator system of the present invention can be retained in a reverse flow system.

What is claimed is:

1. A fluid filter, comprising:
    a. a filter housing forming a filter chamber with an open top;
    b. a dome-like cover including top wall means and side wall means mounted on said open top, said cover including a tubular guide portion which extends downwardly into said filter chamber a predetermined distance;
    c. a tubular filter element having an open top end and a bottom end;
    d. means including closure means at said bottom end for mounting said filter element in said chamber for guided sliding movements thereof between a normal fluid filtering position adjacent said cover and a displaced position in response to clogging thereof, said means further including a tubular bypass member having a lower end portion thereof engaging said open top end of said filter element, and an upper end portion thereof slidably extending into said tubular guide portion, said bypass member having bypass openings therein to permit fluid to bypass the filter element upon movement of said filter element and bypass member to the displaced position;
    e. means biasing said filter element to the normal fluid filtering position;
    f. a fluid inlet passageway in said cover in fluid communication with said tubular guide portion and leading to the interior of the filter element through said bypass member and a fluid outlet passageway in said cover leading to the filter chamber exterior of the filter element;
    g. a pair of upstanding tabs mounted on said upper end portion of said bypass member which extend upwardly into said dome-like cover, said tabs moving with said bypass member and filter element to indicate a clogged condition;
    h. a pair of viewing windows, each window mounted in a side wall of said cover below a top wall thereof and in close proximity to each of said tabs to permit visual observation of said tabs; and
    i. said cover including walls located in close proximity to each of said tabs opposite each of said windows to define a downwardly opening narrow pockets around said tabs, said pockets forming air pockets to resist entry of fluid therein.

2. Fluid filter apparatus, comprising:
    a. a filter housing having an open top end and a closed bottom end, defining a filter chamber;
    b. cover means including top wall means, side wall means, peripheral bottom wall means engaging said open top end, bottom web means extending horizontally inwardly therefrom, and centrally positioned, tubular guide means;
    c. a rod carried by said bottom end, extending through said filter chamber;
    d. a tubular filter element mounted on said rod in said filter chamber having an open top end, and having bottom closure means secured thereto with an axial opening thereof slidably mounted on said rod;
    e. a tubular bypass member having a lower end portion thereof engaging said open top end of said filter element, an upper end portion thereof slidably extending into said tubular guide means, and means associated with said bypass member to maintain the bypass member and upper end of the filter element coaxial with respect to the rod during a bypass condition;

f. said cover means having a first fluid passageway leading to the top of said tubular guide means and a second fluid passageway leading to an annular chamber between said filter element and said housing;

g. said filter element and bypass member being movable on said rod between bypass and normal flow positions, said bypass member having bypass opening means therein to permit fluid to bypass said filter element upon movement of said filter element and bypass member to said bypass position;

h. a spring on said rod engaging said closure member to normally bias said filter element and bypass member to the normal flow position; and i. viewing window means mounted in said side wall means of said cover means below said top wall means thereof, and tab means mounted on said bypass member which extend upwardly behind and in close proximity to said window means to permit visual observation thereof, said tab means moving with said bypass member to indicate a bypass condition.

3. Fluid filter apparatus, comprising:

a. a generally cylindrical filter housing having an open top end and a closed bottom end, defining a filter chamber;

b. a cover member having a top wall, side walls, an outer, generally circular bottom portion engaging said open top end, a bottom web portion extending horizontally inwardly therefrom, and a coaxially positioned, cylindrical guide portion connected to said web portion;

c. a rod carried by said bottom end, extending axially through said filter chamber;

d. a spring on said rod adjacent said bottom end;

e. a cylindrical filter element mounted coaxially on said rod between said guide portion and said spring, having an open top end, and having bottom, spring engaging closure means secured thereto with an axial opening thereof slidably mounted on said rod;

f. a tubular bypass member having a lower end portion thereof engaging said open top end of said filter element, and an upper end portion thereof slidably extending into said cylindrical guide portion;

g. said cover member having an inlet passageway leading to a top end of said cylindrical guide portion, and a separate outlet passageway leading through said web portion to an annular chamber between said filter element and housing;

h. said filter element and bypass member being movable on said rod downwardly against said spring, said bypass member having bypass opening means in a wall thereof to permit fluid to bypass said filter element upon said movement of said filter element and bypass member and means associated with said bypass member to maintain the bypass member and the upper end of the filter element coaxial with respect to the rod during a bypass condition;

i. a viewing window mounted in a side wall of said cover member below said top wall thereof, and a tab mounted on said bypass member which extends upwardly directly behind said window to permit visual observation thereof, said tab moving downwardly with said bypass member to indicate a bypass condition; and j. said cover member including a wall located opposite said tab from said window to define a downwardly opening pocket around said tab, said pocket forming an air pocket to resist entry of fluid therein.

* * * * *